United States Patent
Flynn

[15] 3,698,194
[45] Oct. 17, 1972

[54] AUTOMATICALLY AERATED LEACHING FIELD SYSTEM

[72] Inventor: John F. Flynn, 358 Strawberry Hill Road, Concord, Mass. 01742

[22] Filed: Feb. 1, 1971
[21] Appl. No.: 111,209

[52] U.S. Cl. ............... 61/11, 210/176, 210/532, 251/128
[51] Int. Cl. ...... E02b 11/00, B01d 21/10, C02c 1/18
[58] Field of Search ........ 61/11, 13, 12, 10; 210/121, 210/73, 259, 170, 7, 4, 532 S; 137/600; 251/128

[56] References Cited

UNITED STATES PATENTS

| | | | |
|---|---|---|---|
| 924,285 | 6/1909 | Smith | 210/532 S |
| 1,795,123 | 3/1931 | Harris | 210/532 S |
| 2,944,669 | 7/1960 | Schaaf | 61/13 X |
| 1,408,548 | 3/1922 | Trowbridge | 61/11 |
| 2,432,887 | 12/1947 | Haviland | 210/121 |
| 2,362,747 | 11/1944 | Duke | 61/12 |
| 3,425,226 | 2/1969 | Santeford, Jr. | 61/13 |
| 3,564,854 | 2/1971 | Berthold | 61/13 |

Primary Examiner—Jacob Shapiro
Attorney—Russell & Nields

[57] ABSTRACT

A sewage system comprising a septic tank, an air vented distribution chamber, and a leaching field formed of an array of air vented leaching canals. The flow of effluent from the distribution chamber into each leaching canal can be controlled from above ground. Air can be forced through the system by incorporating fans at the vents of the distribution chamber and leaching canals. By properly cycling the flow of air with the flow of effluent, a more efficient and longer lasting leaching field system with less pollution of nearby soil and water results, due to improved aerobic action, increased evaporation, and benefits from total drying of each canal.

11 Claims, 4 Drawing Figures

PATENTED OCT 17 1972 3,698,194

INVENTOR
JOHN F. FLYNN
BY Russell & Nields
ATTORNEYS

AUTOMATICALLY AERATED LEACHING FIELD SYSTEM

BACKGROUND OF THE INVENTION

1. Field of the Invention

This invention relates to sewage systems; more specifically, the invention is concerned with sewage systems comprising a septic tank, a distribution chamber and leaching canals.

2. Prior Art

In a sewage system of this type, the sewage first enters a septic tank where solids settle out to be partially decomposed. The effluent, composed basically of liquids but containing some solids, drains off into a distribution chamber and is there distributed through connecting pipes into leaching canals where further decomposition by aerobic or bacterial action takes place. Most of the effluent then seeps into the ground.

The major probelm with this arrangement is that occasionally and for varying reasons the leaching field is unable to dispose of the amount of effluent flowing into it: the surrounding ground may become saturated; the canals may become clogged with solids; or the intake may simply be too great for the size of the leaching filed. For example, clay-type soil is a particularly poor absorber of water; a leaching field in such soil is relatively expensive and inefficient since a relatively large field must be employed. As another example, a dual problem is presented by grease contained in the effluent, which often stems from the use of detergents. The grease not only tends to coat the bottom of the leaching canal but also affects the porosity of the soil into which it flows. When the accumulated grease causes clogging it becomes necessary to physically enter and clean out the clogged canal.

In addition, effluent absorbed into the ground during the course of continuous charging of the leaching canals gradually spreads through the surrounding soil and can leak into and pollute nearby lakes and rivers.

SUMMARY

The basic objects of this invention are the provision of means for improving the effluent handling capability of a given leaching field while avoiding the problems of effluent disposal and pollution found in the prior art. These objects are accomplished by providing means for increasing the rate of both effluent evaporation and of aerobic action on the effluent, and by providing means for totally drying any selected canal and the soil in its immediate vicinity. Among other benefits, the detrimental effect of the grease contained within the effluent is alleviated.

In the accomplishment of these objects, air is forcibly circulated throughout at least a selected portion of the system; as an example, the preferred embodiment contains fans at filtered vents of the leaching canals and distribution chamber. In practice, the positioning and size of the fans are dependent upon the size of the leaching field and rate of evaporation required.

In addition to the use of forced air, the flow of effluent to each canal can be regulated as desired. For example, one or more connecting pipes may be lifted above the level of effluent in the distribution chamber, shutting off effluent flow to the associated canals. Alternatively, the desired regulation may be obtained by placing an individually adjustable blocking element within each connecting pipe.

In operation of the system, the flow of effluent to at least one canal is shut off, while flow to the remainder of the field is maintained. Forced air is caused to flow through the canal which has been shut off. The forced air flowing over the effluent increases evaporation, aids in aerobic action in the effluent, and eventually dries both the residue solids of the effluent in the shut-off canal and the soil immediately surrounding the canal. Once dried, the forced air can be discontinued, the canal returned to normal flow, and another canal cycled through the drying procedure.

This system therefore not only enables increased evaporation of and aerobic action on the effluent, but also eliminates the detrimental effects of the grease present in the effluent. As the residue solids dry in the shut-off canal, the grease dries into a flake-like substance which is washed away by the next inflow of effluent, thereby removing the grease coating on the bottom of the canal.

BRIEF DESCRIPTION OF THE DRAWINGS

The invention may be best understood from the following detailed description thereof having reference to the accompanying drawings in which.

DETAILED DESCRIPTION OF THE INVENTION

Figure 1:
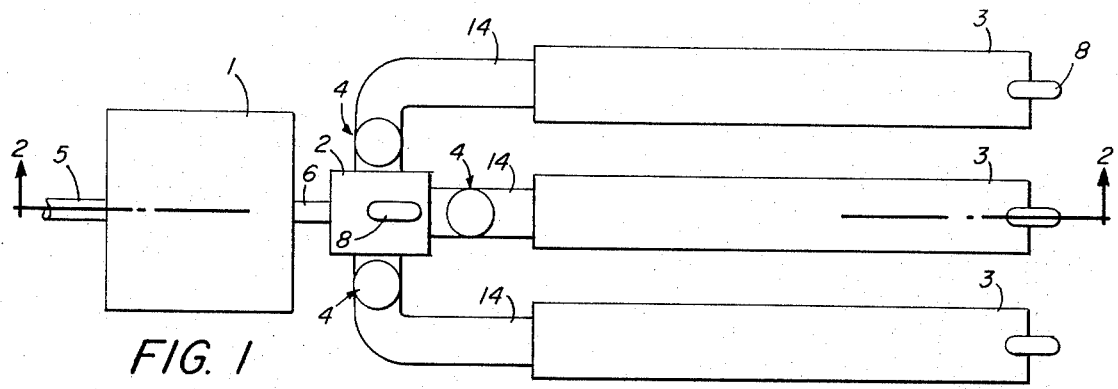
FIG. 1 is a top view of a sewage system with vented distribution chamber and a leaching field of three vented leaching canals.
Figure 2:
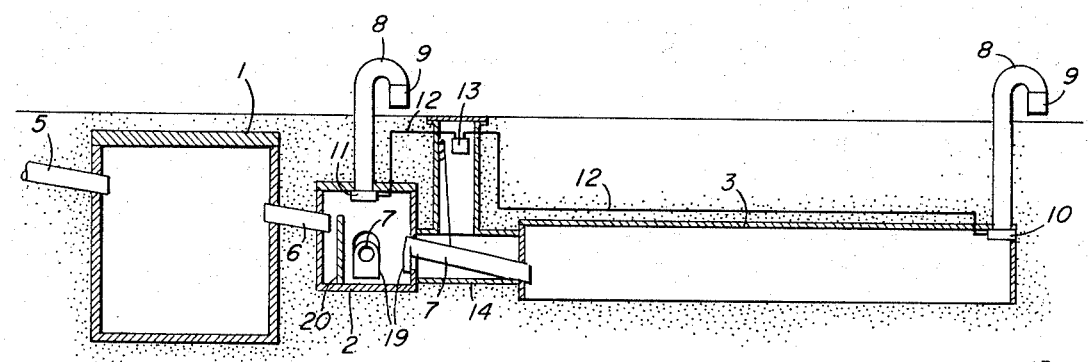
FIG. 2 is a side view in cross-section of the sewage system of FIG. 1, taken along line 2—2.

With reference to FIGS. 1 and 2, a sewage system utilizing the invention is illustrated comprising first a septic tank 1, a distribution chamber 2, leaching canals 3, and flow-control mechanisms indicated at 4. Although three leaching canals are shown, any number might be used, according to the needs of the particular system. As in a typical sewage system, sewage flows through a sewer pipe 5 into the septic tank 1, where decomposition begins and many solids settle out. Effluent, comprised generally of liquids, flows from the septic tank 1 through a sewage pipe 6 to the distribution chamber 2. There it is distributed among connecting pipes 7 protruding into the interior of the chamber, and flows past control mechanisms 4 to the leaching canals 3. The effluent continues to be subjected to bacterial and aerobic action in the leaching canals, where some of the effluent evaporates and the remainder is absorbed into the surrounding soil.

The canals 3 and distribution chamber 2 are vented by air vents 8 with carbon filters 9 to remove noxious fumes.

Electric fans 10 and 11 are provided within the system to forcibly circulate air. In a preferred embodiment, as shown in FIG. 2, exhaust fans 10 are positioned at the vents 8 of the canals; an intake fan 11 is positioned at the vent 8 of the distribution chamber 2. Electrical wiring 12 and a switch box 13 control the fans. Of course it is possible to change the orientation of the fans, as by mounting the intake fan 11 on a shelf as shown in FIG. 3 and directing it onto the inlet of a connecting pipe 7.

Figure 3:
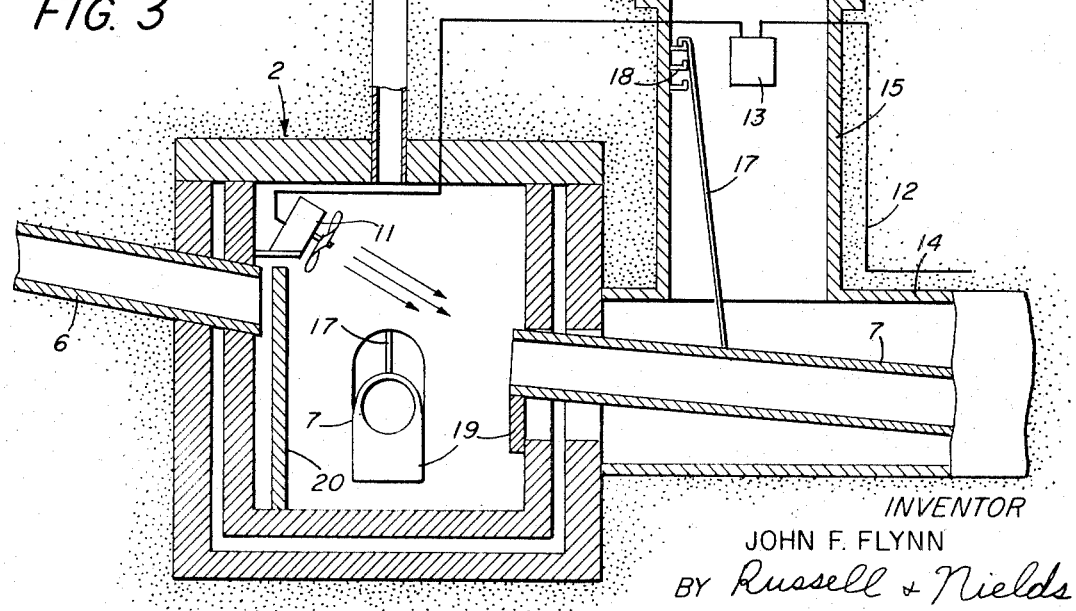
FIG. 3 is an expanded view in cross-section of a distribution chamber and one embodiment of control mechanism.

With more particular reference to FIG. 3, the control mechanism, indicated at 4, contains means for regulating the flow of effluent from the distribution chamber 2 to a canal 3. In a preferred embodiment this control mechanism includes a sleeve pipe 14, formed of cast iron or steel, surrounding each connecting pipe 7. A gate box 15 is placed atop the sleeve pipe 14, and covered by an access manhole 16. An adjusting rod 17 is attached to the connecting pipe 7 through an opening in the sleeve pipe 14, and is removably fastened to adjusting hooks 18.

Figure 4:
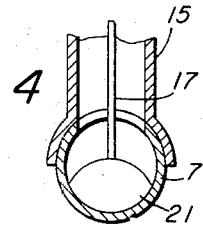
FIG. 4 is a fragmentary view in cross-section of another embodiment of control mechanism.

The connecting sewer pipe 7 can then be vertically adjusted a desired distance; in the preferred embodiment approximately 2 inches of free travel are obtained by having the inside diameter of the sleeve pipe 14 at least two inches wider than the outside diameter of the connecting pipe 7. This two inch free travel enables the connecting pipe 7 to be pulled out of the effluent, shutting off the flow of effluent to the associated leaching canal. A depending tab 19 at that end of the sewer pipe 7 within the distribution chamber 2 prevents leakage into the sleeve pipe 14. Each connecting pipe is provided with a control mechanism such as the one indicated at 4. A baffle 20 comprising a vertical slab of concrete or other convenient material may be placed near the entrance of the sewage pipe 6 into the distribution chamber 2 to limit effluent motion within the distribution chamber should a surge of effluent be received. Instead of lifting a connecting pipe 7 out of the effluent to shut off effluent flow to a leaching canal 3, an effluent blocking element 21 may be placed directly inside the connecting pipe 7 as shown in FIG. 4. The bottom of the element 21 is rounded to conform to the curve at the bottom of the connecting pipe 7. It is held at the end of the adjusting rod 17, which extends through a hole in the pipe. Effluent flow is controlled by moving the blocking element 20 up or down or by turning it sideways. The connecting pipe 7 remains stationary, and sleeve pipes are not needed.

The leaching canals operate in either of two modes: a normal mode, or a drying mode. In the normal mode effluent flows into the canal, and the exhaust fan 10 of that canal is off. In the drying mode, the flow of effluent into a canal is shut off at the control mechanism 4 of that canal, and the exhaust fan 10 of that canal is on. When any exhaust fan 10 of any canal is on, the intake fan 11 in the distribution chamber 2 is also on.

The operational cycle of the preferred embodiment consists of one canal being in a normal mode with the other two canals in a drying mode. Once a canal is dry, it is placed in a normal mode and the canal previously in a normal mode is changed to a drying mode. In the case of a steady intake of effluent into the distribution chamber 2, this operational cycle could run continuously with, at a given time, one canal in the normal mode and the remaining canals in the drying mode.

Of course, a particular advantage of this system is that the cycling can be adjusted to meet differing needs of the system by changing the fan operation or the distribution of sewage among canals. If, for example, the intake of effluent is relatively slow, the cycling could be interrupted for a time by turning off the fans. In the same situation of low intake, it might be desireable to feed two canals at a time while drying only one. In a situation where more effluent must be handled, e.g., if the soil becomes saturated or if there is simply a higher input, other cycles could be used: the exhaust fans in the canal at normal mode could also be running, increasing evaporation and providing more air for aerobic action in the effluent. In any case, the placement and power of the fans are dependent upon the needs of the system. For example, if more effluent must be handled, more powerful fans, with more vents, might be needed. Conversely, if less effluent must be handled, less powerful fans or even no exhaust fan could be used.

Means of control other than the two mechanisms indicated at 4 in FIGS. 3 and 4 could be readily used. For example, electrically controlled gate valves could be placed in the connecting pipes 7, and a simple timing mechanism used to run the canals and fans through the cycles.

During the drying cycle not only the leaching canal itself but also the immediately surrounding soil is dried, removing the danger of soil saturation. This advantage is most important for soils with poor water absorption characteristics, such as clays. In addition, drying the soil eliminates or at least retards the tendency of effluent to spread out from the leaching canal and pollute nearby water sources. The present invention is particularly useful when employed in connection with laterally vented leaching canals as described in my copending application Ser. No. 831,881, filed June 10, 1969. No limitation to that type of leaching canal is intended, however, as the present invention is effective for other leaching canals also.

Having thus described the principles of the invention together with several illustrative embodiments thereof, it is understood that, although specific terms are employed, they are used in a generic and descriptive sense, and not for the purpose of limitation, the scope of the invention being set forth in the following claims.

I claim:

1. A sewage disposal system comprising a distribution chamber and a plurality of leaching canals, said leaching canals stemming from said distribution chamber, control means for selectively intercepting the flow of sewage, but not the flow of air, between said distribution chamber and one or more of said leaching canals and diverting said sewage flow to the other canals, and means for promoting air flow through intercepted canals.

2. The sewage disposal system of claim 1 wherein said control means comprises connecting pipes between said distribution chamber the entrance to and each of said leaching canals, each said connecting pipe being vertically adjustable whereby the flow of sewage to a leaching canal may be intercepted by an upward adjustment of the corresponding connecting pipe.

3. A sewage disposal system comprising a distribution chamber and a plurality of leaching canals, said leaching canals stemming from distribution chamber, and control means for selectively shutting off the flow of sewage to one or more of said leaching canals and diverting said sewage flow to the canals not shut off, said control means comprising connecting pipes between said distribution chamber and each of said leaching canals, each said connecting pipe containing a moveable sewage blocking element conforming to the bottom portion thereof which may be positioned to shut off the flow of sewage through said pipe.

4. The sewage disposal system of claim 1 wherein said air flow promoting means comprise means for circulating air through a leaching canal to which the flow of sewage has been intercepted, whereby liquid is removed from said canal by evaporation into said circulated air, said circulating means including at least one air vent at each leaching canal and at least one vent at the distribution camber.

5. The sewage disposal system of claim 4 further defined as including means for moving air by force through said leaching canals by circulation between said vented distribution chamber and said leaching canal vents.

6. A sewage disposal system comprising a distribution chamber, a plurality of leaching canals, said leaching canals stemming from said distribution chamber, control means for adjusting the relative distribution of sewage among said leaching canals, at least one air vent at each leaching canal and at least one vent at the distribution chamber, and at least one fan within said leaching field for moving air by force through at least a portion of said leaching field.

7. A sewage disposal system comprising a distribution chamber, a plurality of leaching canals, at least one air vent at each leaching canal and at the distribution chamber, means for controlling the flow of sewage to each canal, and means for moving air by force through at least a portion of said leaching field, said means for moving air by force comprising an exhaust fan at each said air vent of a canal and an intake fan at each said air vent of said distribution chamber.

8. In a leaching field system having a plurality of leaching canals stemming in parallel from a distribution chamber, a method for increasing the sewage effluent handling capacity of said system while reducing its polluting effect on nearby soil and water comprising: directing sewage effluent into some of said leaching canals while cutting off effluent flow into the remaining leaching canals, drying each of said cut off canals, and periodically alternating the leaching canals to which effluent is directed and the leaching canals undergoing drying.

9. In a leaching field system having a plurality of leaching canals stemming from a distribution chamber, a method for increasing the sewage effluent handling capacity of said system while reducing its polluting effect on nearby soil and water comprising directing sewage effluent into some of said leaching canals while cutting off effluent flow into the remaining leaching canals, circulating air through air vents provided in each of said leaching canals and in said distribution chamber, drying each of said cut off leaching canals by evaporation of effluent therein into said circulated air, and periodically alternating the leaching canals to which effluent is directed and the leaching canals undergoing drying.

10. The sewage disposal system of claim 5 wherein said means for moving air comprises at least one fan within each of said leaching canals.

11. The sewage disposal system of claim 2, wherein each connecting pipe is provided at the distribution box end with a downwardly depending tab adapted to prevent the flow of sewage under said pipe when said pipe is adjusted upwardly.

* * * * *